United States Patent [19]

Ansel et al.

[11] Patent Number: 4,932,750
[45] Date of Patent: Jun. 12, 1990

[54] SINGLE-COATED OPTICAL FIBER

[75] Inventors: Robert E. Ansel, Des Plaines; Orvid R. Cutler, Jr., Rolling Meadows, both of Ill.

[73] Assignee: DeSoto, Inc., Des Plaines, Ill.

[21] Appl. No.: 448,252

[22] Filed: Dec. 9, 1982

[51] Int. Cl.[5] .................... G02B 6/00; C08F 2/50; C08F 216/14; C08F 220/20
[52] U.S. Cl. .................... 350/96.34; 522/96; 522/181; 522/14; 526/301; 427/54.1
[58] Field of Search ............. 204/159.19; 428/425.6; 522/96; 350/96.34; 427/54.1

[56] References Cited

U.S. PATENT DOCUMENTS

| | | | |
|---|---|---|---|
| 3,642,943 | 2/1972 | Noel | 525/454 |
| 3,650,669 | 3/1972 | Osborn et al. | 522/104 |
| 3,700,643 | 10/1972 | Smith et al. | 522/173 |
| 3,741,918 | 6/1973 | Koleske et al. | 525/410 |
| 3,746,665 | 7/1973 | Koleske et al. | 525/410 |
| 3,759,807 | 9/1973 | Osborn et al. | 522/182 |
| 3,782,961 | 1/1974 | Takahashi et al. | 522/97 |
| 3,891,523 | 6/1975 | Hisamatsu et al. | 522/96 |
| 3,954,584 | 5/1976 | Miyata et al. | 522/96 |
| 4,013,806 | 3/1977 | Volkert et al. | 522/97 |
| 4,097,439 | 6/1978 | Darling | 522/97 |
| 4,131,602 | 12/1978 | Hodakowski et al. | 204/159.19 |
| 4,145,509 | 3/1979 | Bhatia | 525/455 |
| 4,163,809 | 8/1979 | McGinniss et al. | 522/102 |
| 4,180,598 | 12/1979 | Emmons | 204/159.16 |
| 4,182,790 | 1/1980 | Schmidle | 204/159.23 |
| 4,187,366 | 2/1980 | Friedlander et al. | 528/49 |
| 4,233,425 | 11/1980 | Tefertiller et al. | 204/159.19 |
| 4,261,872 | 4/1981 | Emmons et al. | 525/921 |
| 4,284,731 | 8/1981 | Moser et al. | 525/455 |
| 4,287,323 | 9/1981 | Tefertiller et al. | 522/96 |
| 4,297,185 | 10/1981 | Chevreux et al. | 428/425.6 |
| 4,319,811 | 3/1982 | Tu et al. | 204/159.23 |
| 4,331,704 | 5/1982 | Watson et al. | 204/159.13 |
| 4,332,329 | 6/1982 | Scrivens et al. | 428/425.6 |
| 4,390,589 | 6/1983 | Geyling et al. | 428/381 |
| 4,407,561 | 10/1983 | Wysocki | 428/388 |

Primary Examiner—John C. Bleutge
Assistant Examiner—Arthur H. Koeckert
Attorney, Agent, or Firm—Dressler, Goldsmith, Shore, Sutker & Milnamow, Ltd.

[57] ABSTRACT

Radiation-curable coating compositions particularly adapted for the single coat coating of optical fibers are disclosed. These comprise (1) from 65% to 85% of a diethylenic-terminated polyurethane, which may contain urea groups, the polyurethane being based on a diisocyanate having an average molecular weight of from 400 to 5000; and (2) from 5% to 25% of an ether of a $C_2$–$C_4$ alkylene glycol monoester of a monoethylenically unsaturated monocarboxylic acid, the ether being selected from the group consisting of ethoxyethyl, dicyclopentenyl, phenyl, and mixtures thereof. Ethoxyethoxyethyl acrylate is particularly preferred. A triacrylate ester, such as trimethylol propane triacrylate, is also desirably present.

12 Claims, No Drawings

SINGLE-COATED OPTICAL FIBER

DESCRIPTION

1. Technical field

This invention relates to the coating of optical fibers using radiation-curable coating compositions, and more particularly to the provision of ultraviolet curable compositions which can be applied directly to the glass surface of the optical fibers, and which are harder and stronger than the low modulus buffer coatings usually employed and which require overcoating to provide desired mechanical strength.

2. Background Art

Optical glass fibers are acquiring increasing importance for communication purposes, but in order to use the glass fibers it is necessary to protect the glass surface from moisture and abrasion. This is done by coating the glass fiber immediately following its formation. Solvent solution coatings and extrusions have been applied, but these present problems which have been solved to a considerable extent by the employment of ultraviolet light-curable coating compositions.

One problem presented by the use of coatings which are adhered to the glass surface of the optical fiber is caused by the difference in response to change in temperature between the glass and the coating which contributes to microbending of the fibers, especially when very low temperatures are encountered. To minimize this problem, coatings possessing a very low modulus are selected to provide the primary coating, and ultraviolet curable primary coating compositions have been developed which possess this low modulus. These are more fully described in certain commonly owned applications, namely: the application of Robert E. Ansel Ser. No. 170,148 filed July 18, 1980, now U.S. Pat. No. 4,624,994, and the application of Robert E. Ansel, O. Ray Cutler and Elias P. Moscovis Ser. No. 398,161 filed July 19, 1982, now U.S. Pat. No. 4,496,210.

In order to provide the desired low modulus in the primary coatings, one must sacrifice desired hardness and toughness in the coating which contacts the glass, so a secondary coating has been applied on top of the primary coating. This requires that two coatings be applied and cured, and this complicates production and increases the cost of the product In an effort to provide a single coating with a sufficiently low modulus that it will minimize the microbending problem at low temperature, but which will be harder and tougher than before so that commercially practical results can be achieved with a single radiation-curable coating, certain diethylenic-terminated polyurethanes have been modified by mixing with them a small proportion of a low $T_g$ monomer, such as 2-hydroxyethyl acrylate or ethylhexyl acrylate, and these mixtures have proven useful. However, the cure rate was less than desired, and the viscosity of the coating compositions was higher than desired. Also, the strength of the cured coatings was less than desired, having in mind the viscosity of the coating composition.

DISCLOSURE OF INVENTION

In accordance with this invention, a radiation-curable coating composition is provided in which (1) from 65% to 85% of the coating composition is constituted by a diethylenic-terminated polyurethane, which may contain urea groups, said polyurethane being based on a diisocyanate having an average molecular weight of from 400 to 5000, preferably from 800 to 2500; and (2) from 5% to 25% of the coating composition is constituted by an ether of a $C_2$–$C_4$ alkylene glycol monoester of a monoethylenically unsaturated monocarboxylic acid, the ether being selected from the group consisting of ethoxyethyl, dicyclopentenyl, phenyl, and mixtures thereof.

Thciae named monomers set forth as component (2) of the mixture are all of low $T_g$, but unlike the low $T_g$ monomers used previously, they provide combinations of radiation-curable components having great physical hardness and strength in a coating of sufficiently low modulus as to minimize microbending at the low temperatures which may be encountered in the field. Moreover, the viscosity of the coating composition is minimized to enable rapid coating, the radiation cure speed is enhanced to enable rapid cure, and the combination of low modulus and final hardness and strength is made more favorable.

In this specification and the accompanying claims, all proportions are by weight, unless otherwise specified. Also, acrylates will be discussed as the prime illustration of the diethylenic-terminated polyurethanes and of the selected low $T_g$ ether monomers. However, it will be appreciated that other ethylenically unsaturated groups may be used, as will be illustrated.

$T_g$ identifies the glass transition temperature of a polymer, and with reference to a monomer it denotes the glass transition temperature of a homopolymer of the monomer.

Referring more particularly to the diacrylate-terminated polyurethanes, these are formed by providing acrylate-functional terminal groups on a diisocyanate-terminated product having a molecular weight in the range of 400 to 5000, preferably 800 to 2500. While several production procedures are available, the diisocyanate-terminated product can be described as the reaction product of an organic diisocyanate with an aliphatic molecule having two isocyanate-reactive hydrogen atoms, as may be provided by the OH, SH, or $NH_2$ groups. These diisocyanate-terminated reaction products include from 2 to 10 urethane and/or urea groups, preferably from 2 to 4 such groups.

The aliphatic groups may be a simple alkane diol, such as 1,6-hexane diol, but it is preferred that the aliphatic groups be selected from polyether, polyester and polyether-ester groups. Polyether groups are illustrated by polytetramethylene glycol, polyester groups by the ester reaction product of two moles of ethylene glycol with one mole of adipic acid, and polyether-ester groups by the ester reaction product of two moles of diethylene glycol with one mole of adipic acid.

Appropriate diisocyanates may be aliphatic or aromatic, such as isophorone diisocyanate, 2,4-toluene diisocyanate and its isomers, and hexamethylene diisocyanate. Toluene diisocyanates are preferred, and this class of materials is well known in the art.

Diacrylate termination of the diisocyanates may be accomplished in various ways. Thus, one can form the higher molecular weight diisocyanates first, and then react with 2 molar proportions of hydroxy alkyl acrylate to thereby place one such unsaturated group on each available isocyanate group. These hydroxy alkyl acrylates may have from 2 to 6 carbon atoms in the alkyl group and are illustrated by 2-hydroxyethyl acrylate and by 2-hydroxy propyl acrylate. Correspondingly, one can first react the hydroxy alkyl acrylate with one molar proportion of a low molecular weight diisocyanate and then react two molar proportions of the unsaturated monoisocyanate so-formed with one mole of a dihydroxy compound which provides the desired molecular weight. Both procedures are known to the art.

Urea groups may be incorporated into the polyurethane by reacting one mole of the previously described diisocyanates with one mole of 2-hydroxyethyl acrylate to provide an unsaturated urethane product containing a single unreacted isocyanate group. By then reacting two moles of this monoisocyanate with one mole of a diamine, such as butylene diamine, we obtain a polyurea polyurethane having two terminal acrylate groups. Urea-containing diacrylates are further illustrated in U.S. Pat. No. 4,097,439.

It is desired to point out that the diethylenic polyurethanes which are to constitute at least 65% of the coating composition cannot be used alone for several reasons. First, the radiation cure is slow, which is especially unfortunate in coating optical fibers where adequate line speed is important. Second, the polyurethanes are too viscous for rapid application by themselves. Also, the radiation-cured coatings are too hard and not sufficiently elastic (the modulus is too high). In this invention, it is found that the relatively small proportion of the low $T_g$ liquid monomer functions to reduce viscosity and to increase the speed of radiation cure. Of greatest importance, the low $T_g$ liquid monomer reduces the modulus without excessively weakening the coating, and this is a surprise. The result is a coating which can be applied and radiation-cured with reasonable rapidity, and which has a low enough modulus to minimize microbending combined with enough hardness and toughness to withstand the expected abrading forces.

It is desired to point out that the special low $T_g$ monomers used herein, and especially ethoxyethoxyethyl acrylate, which is preferred, provides a significant improvement over the prior use of ethylhexyl acrylate and hydroxyethyl acrylate. In the comparative data presented hereinafter, it will be seen that the ethoxyethoxyethyl acrylate enabled us to provide a coating composition characterized by lower viscosity and increased cure speed, as well as greater tensile strength, hardness and rupture strength. This is achieved together with a lower coefficient of thermal expansion below the glass transition temperature of the coating. These benefits have been obtained without an excessive increase in modulus. In a further modification which used less of a triacrylate component and more ethoxyethoxyethyl acrylate, acceptable physical properties are still obtained, but in this instance the viscosity is even lower, the cure speed is enhanced (though not as much) and the modulus is also reduced.

It is also helpful to have present a triacrylate ester in an amount of from 1% to 15% of the coating composition. Trimethylol propane triacrylate is preferred, but one can also use pentaerythritol triacrylate. The triacrylate lowers the coating viscosity and increases the cure speed, and is therefore beneficial, but satisfactory properties are obtained without it.

The radiation which effects cure will vary with the photoinitiator used. Even visible light may be employed using appropriate photoinitiators. These are illustrated by camphor quinone and coumarin which are used together with a tertiary amine, such as triethyl amine. Diphenylbenzoylphosphine oxide is useful in and near the ultraviolet range.

Since ultraviolet light is preferred, acrylic unsaturation is best, but since the radiation character can vary, so can the specific character of the unsaturation. Other useful ethylenic unsaturations are illustrated by methacrylic, itaconic, crotonic, allylic, vinylic, etc. These can be provided (using methacrylic unsaturation as illustrative) by reaction of isocyanate functionality with 2-hydroxyethyl methacrylate. Allylic unsaturation may be introduced using allyl alcohol in place of 2-hydroxyethyl acrylate. Vinylic unsaturation may be introduced using hydroxy butyl vinyl ether in place of 2-hydroxyethyl acrylate.

Accordingly, while acrylate unsaturation has been referred to previously as illustrative and preferred, other radiation curable monoethylenically unsaturated groups may be used in its place in the manner illustrated for methacrylic unsaturation. Of course, stronger radiation is needed for these other types of unsaturation, as is well known, and such other radiation is illustrated by electron beam radiation.

When ultraviolet light is employed, the coating composition preferably contains a photoinitiator which is usually a ketonic photoinitiator, such as about 3% of diethoxy acetophenone. Other photoinitiators are also known, such as acetophenone, benzophenone, m-chloro-acetophenone, propiophenone, thioxanthone, benzoin, benzil, anthraquinone, and the like. The photoinitiators may be used single or in mixtures, and are present in an amount up to about 10% of the coating (usually 1-5%). Various amines may also be added, like diethyl amine, but are not needed herein.

The radiation-curable coatings which are provided in accordance with this invention may be used for adhesives or for the coating of flexible floor tiles, but are very importantly unique when applied as single coatings of optical glass fiber. Regardless of the use to which the coatings of this invention are put, and regardless of the radiation energy used to cure the same, they possess the same combination of superior hardness and toughness which allows them to serve as the sole coating on optical fibers without causing microbending of the fibers at low temperature because of excessive modulus.

Most radiation-cured coatings have a much higher modulus and are too brittle to be useful herein. When these more brittle coatings are modified to make them less brittle, they possess little strength. The combination of reduced modulus with considerable strength provided herein adapts the instant coatings for specialized purposes, as previously described.

The invention is illustrated by a series of coating compositions formulated by simple mixing of the components tabulated below. The mixture is warmed to about 55° C. for 1 hour to dissolve all of the components.

TABLE 1

| Component | Ex. 1 | Ex. 2 | Ex. 3 | Ex. 4 | Ex. 5 |
|---|---|---|---|---|---|
| 1 | 77.2 | 77.2 | 76.6 | 75.4 | 73 |
| 2 | 18.1 | 14.9 | — | — | — |
| 3 | 2.8 | 2.8 | 2.8 | 2.5 | — |
| 4 | 0.01 | 0.01 | 0.01 | 0.01 | 0.01 |
| 5 | 0.9 | 0.8 | 0.9 | — | — |
| 6 | — | 2.5 | 11.5 | 9.0 | 2.5 |
| 7 | — | — | — | 0.4 | 1.0 |
| 8 | — | — | 7.6 | — | — |
| 9 | — | — | — | 12.4 | 16.3 |

TABLE 1-continued

| Component | Ex. 1 | Ex. 2 | Ex. 3 | Ex. 4 | Ex. 5 |
|---|---|---|---|---|---|
| 10 | — | — | — | — | 5.0 |

In the above tabulation, component 1 is an adduct of two moles of 2-hydroxyethyl acrylate with one mole of a diisocyanate-terminated polyurethane made by adducting a mixture of toluene diisocyanates (80% 2,4-isomer and 20% 2,6-isomer) with a polytetramethylene glycol formed by polymerizing tetrahydrofuran to form a polyether diol having a molecular weight of 600–800. The polyurethane formed by acrylating this diisocyanate has a molecular weight of about 1900 and includes an average of 5–6 urethane groups per molecule. The du Pont product Adiprene L-200 may be used as component 1.

Component 2 is 2-hydroxyethyl acrylate.
Component 3 is benzophenone, a photoinitiator.
Component 4 is phenothiazine.
Component 5 is diethyl amine.
Component 6 is trimethylol propane triacrylate.
Component 7 is benzil dimethyl ketal which serves as a photoinitiator. Irgacure 651 of Ciba-Geigy may be used as component 7.
Component 8 is 2-ethylhexyl acrylate.
Component 9 is ethoxyethoxyethyl acrylate.
Component 10 is phenoxyethyl acrylate.

Small amounts of auxiliary agents are useful in the tabulated examples. One function served by such agents is to provide surface lubricity, a nonessential function. In examples 1 and 2, 0.01% of petrolatum was included. All of the examples used small amounts of silicone oils. Example 1 used 0.2% of Dow Corning fluid DC 57 and 0.4% of Dow Corning fluid DC 190. Examples 2–5 used the same silicone fluids, but the DC 57 was, respectively, 0.06%, 0.1%, 0.1% and 0.07%. The DC 190 was, respectively, 0.1%, 0.2%, 0.2% and 0.13%. Example 1 also used 0.2% of N-beta-(N-vinylbenzylamino) ethyl-gamma-aminopropyl trimethoxy silane, as the monohydrogen chloride salt.

By applying the coatings tabulated previously to freshly drawn glass fiber in a thickness of 125 microns (the fiber diameter was about 125 microns) and then passing the wet-coated fiber through two tandemly arranged 10 inch medium pressure mercury vapor lamps (300 watts) at a velocity of 1.5 meters per second, the following results are obtained.

TABLE 2

| Property | Ex. 1 | Ex. 2 | Ex. 3 | Ex. 4 | Ex. 5 |
|---|---|---|---|---|---|
| Viscosity at application (cps. at 25° C.) | 7,000 | 8,000 | 12,000 | 7,000 | 4,000 |
| Tensile strength (psi) | 800 | 900 | 1,000 | 1,500 | 750 |
| % elongation | 80 | 60 | 40 | 40 | 50 |
| Modulus at 2.5% elongation | 1,500 | 3,000 | 6,000 | 7,800 | 1,400 |
| Hardness Shore A | 70 | 65 | 68 | 75 | 65 |
| $T_g$ (°C.) | −47 | −47 | −40 | −37 | −49 |
| Coefficient of thermal expansion (below $T_g$)[$\times 10^{-5}$] | 7 | 6 | 7 | 5.6 | 5.5 |
| Cure speed (Ex. 1 is assigned a rating of 1) | 1 | 1 | 1 | 2 | 1.3 |
| Rupture strength (in. lb./in.$^3$) | 500 | 500 | 500 | 700 | 400 |

With reference to Tables 1 and 2, it should be appreciated that Examples 1, 2 and 3 illustrate prior practice, and thus provide a basis for comparing with the improvement provided by this contribution. Examples 3 and 4 are closely comparable, but Example 4 exhibits distinctly superior properties, as discussed previously. Example 5, by increasing the ethoxyethoxyethyl acrylate content, and also by adding phenoxyethyl acrylate (largely at the expense of the trimethylol propane triacrylate) provides much lower viscosity and much lower modulus, while the physical characteristics remain acceptable.

As a matter of interest, the properties of cured coatings reported in Table 2 were measured on a free film having a thickness of about 75 microns.

What is claimed is:

1. A method of producing coated optical glass fiber comprising, applying to freshly formed optical glass fiber a coating of radiation-curable liquid coating composition comprising: (1) from 65% to 85% of the coating composition of a diacrylate-terminated polyurethane, said polyurethane being based on a diisocyanate having an average molecular weight of from 800 to 2500 and which is the reaction product of an organic diisocyanate with an aliphatic diol, said polyurethane containing from 2–4 urethane groups; (2) from 5% to 25% of the coating composition of an ether of a $C_2$–$C_4$ alkylene glycol monoester of acrylic acid, the ether being selected from the group consisting of ethoxyethyl, dicyclopentenyl and phenyl ethers, and mixtures of said ethers, and (3) from 1% to 15% of the coating composition of a triacrylate ester, and then exposing the wet-coated fiber to radiation to cure the coating, said coating being a low microbending coating having a coefficient of thermal expansion of less than about $5.6 \times 10^{-5}$ at below the glass transition temperature of the coating.

2. A method as recited in claim 1 in which said composition further includes a photoinitiator rendering the composition sensitive to ultraviolet light and the wet-coated fiber is exposed to ultraviolet light to cure the coating.

3. A method as recited in claim 1 in which said aliphatic groups are selected from polyether, polyester and polyether-ester groups.

4. A method as recited in claim 3 in which said diethylenic-terminated polyurethane is obtained from an hydroxyalkyl acrylate in which the alkyl group contains from 2 to 6 carbon atoms.

5. A method as recited in claim 4 in which said acrylate is hydroxyethyl acrylate.

6. A method as recited in claim 1 in which said alkylene glycol monoester is ethoxyethoxyethyl acrylate.

7. A method as recited in claim 2 in which said alkylene glycol monoester is ethoxyethoxyethyl acrylate.

8. A method as recited in claim 1 in which said triacrylate is trimethylol propane triacrylate.

9. A method as recited in claim 1 in which said alkylene glycol monoester is present in an amount of from 5% to 15%.

10. A method as recited in claim 9 in which said composition further includes a photoinitiator rendering the composition sensitive to ultraviolet light.

11. An optical glass fiber coated with a radiation-cured coating by the method of claim 1.

12. An optical glass fiber coated with a radiation-cured coating by the method of claim 2.

* * * * *